United States Patent
Morris et al.

(12)

(10) Patent No.: US 6,347,339 B1
(45) Date of Patent: Feb. 12, 2002

(54) DETECTING AN ACTIVE NETWORK NODE USING A LOGIN ATTEMPT

(75) Inventors: Herbert C. Morris, Hawthorne; John S. Calabrese, Mission Viejo, both of CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/203,546

(22) Filed: Dec. 1, 1998

(51) Int. Cl.[7] .......................... G06F 15/173; G06F 15/16
(52) U.S. Cl. ...................... 709/237; 709/224; 709/227; 714/25
(58) Field of Search ................................. 709/225, 227, 709/229, 224, 237, 223; 714/4, 25, 39, 6; 713/200, 201

(56) References Cited

U.S. PATENT DOCUMENTS

| | | | | |
|---|---|---|---|---|
| 5,640,513 A | * | 6/1997 | Dauerer et al. ............. | 709/224 |
| 5,710,885 A | * | 1/1998 | Bondi ......................... | 709/224 |
| 5,793,951 A | * | 8/1998 | Stein et al. .................. | 713/201 |
| 6,021,493 A | * | 2/2000 | Cromer et al. .............. | 713/200 |

OTHER PUBLICATIONS

Sean MacGuire, Big Brother: A Web–based Unix Network Monitoring and Notification System, Oct. 1996, pp. 1–6.*
Sean Macguire, Big Brother: A Web–based System & Network Monitor, slides, SANS, Jun. 1998, pp. 1–21.*
Mark Smith, Testing and Using your Connection, Getting Linux Connected, Feb. 1998, 2 pages.*
Lilach Barazovich et al., The Telnet Protocol, Tel–Aviv University, Jan. 1997, 11 pages.*
Robert–Andre Croteau, BBWARN: A Notification Extension for Big Brother Sidebar: BBNT: An NT client for Big Brother, Sys Admin, Sep. 1998, 2 pages.*
Robert–Andre Croteau, BBWARN: A Notification Extension for Big Brother, Sys Admin, Sep. 1998, 6 pages.*

\* cited by examiner

*Primary Examiner*—Patrice L. Winder
(74) *Attorney, Agent, or Firm*—Hickman Palermo Truong & Becker LLP; Christopher J. Palermo; Carina M. Tan

(57) ABSTRACT

A method and apparatus for notifying a first network node that a second network node has gone off-line during a communication session is disclosed. The first network node may be a client and the second network node may be a server. The client and the server communicate using an embedded protocol, such as telnet. The protocol defines a login process that must be used by the client to establish a logical connection to the server. The protocol also specifies that the server must immediately issue a response to a login attempt, by either establishing a connection or issuing an error message. The first network node determines that no communications have been received from the second server in a pre-determined period of time. The first network node generates invalid login information, such as a randomly generated invalid user id and an invalid password. A login command is sent from the first network node to the second network node. The login command includes the previously generated invalid login information. The second network node responds, indicating that the login information is invalid or that login is refused. The response provides a positive indication to the first network node that the second network node is on-line. The process can be repeated frequently without requiring any significant system resources. If the second network node does not immediately respond, the communication session can be recovered or terminated, thereby maximizing system resources.

24 Claims, 3 Drawing Sheets

DETECTING AN ACTIVE NETWORK NODE USING A LOGIN ATTEMPT

FIELD OF THE INVENTION

The present invention relates generally to telecommunications. The invention relates more specifically to apparatus and methods for allowing a first node of a network, which is communicating with a second node, to know when the second node has gone offline.

BACKGROUND OF THE INVENTION

Many telecommunication functions require computer nodes or servers to connect to remote nodes or servers to retrieve or transmit information. Increasingly, these remote servers are accessed using an asynchronous dial up connection. This class of functions may include, but is not limited to, dial up connections to the Internet, connections to bulletin boards, connections to internal and external databases and sending and receiving faxes. These functions are carried out during interactive communication sessions according to an agreed-upon protocol.

An example of a system that communicates in this manner comprises an Access Control Server and a Network Access Server, both of which are commercially available from Cisco Systems, Inc., and which communicate using protocols called TACACS+or RADIUS. The term "node" refers broadly to a computer or computer device of any kind that communicates within a network, such as a server, client or workstation, router, or switch.

To support remote login sessions, and for other reasons, certain computer facilities allow users to log in remotely from one computer to another. Within the Internet, the most commonly used method is a facility called "telnet," which is the name of the protocol used to support remote login sessions and also the name of the Transmission Control Protocol/Internet Protocol ("TCP/IP") remote login program. TCP/IP refers to the suite of protocols that define the Internet. Originally designed for the UNIX™ operating system, TCP/IP software is now available for every major kind of computer operating system. To be on the Internet, a computer must have TCP/IP software. The telnet protocol defines how local and remote computers talk to each other to support a remote login session. A more complete discussion of remote login using telnet is described in D. Dem, "The Internet Guide For New Users," pp. 247–67 (McGraw Hill 1994).

Many computer users are connected to the Internet by access servers on local area networks or enterprise networks. An example of an access server is model number (AS5200), commercially available from Cisco Systems, Inc. To help defer the cost of installing and maintaining additional phone lines, which may be used very little per user, many equipment manufacturers have added the ability to establish remote sessions on the outbound ports of access servers and routers. These remote sessions are supported by an embedded telnet protocol operating in conjunction with other communication software, such as a communication port director.

To support remote sessions via an access server, as opposed to a direct personal computer/remote service connection, the telnet protocol has undergone revision. The name and the result of the process for disseminating information about a proposed standard on the Internet is known as Request for Comments ("RFC"). The standards are currently proposed and published on-line at urlinfo.internet.isi.edu/in-notes/rfc/files/rfc2217. txt.

A first computer connects to a second computer, under the telnet protocol, using a process known as "login". The login process involves establishing a logical connection between the first computer and the second computer. Generally, a login is carried out as follows. A user issues a login command to the first computer, and provides values for the following parameters: name of the second computer; name of a user account on the second computer; and a password associated with the user account. The first computer sends a login request, packaged according to the telnet protocol and containing the parameter values, to the second computer. The second computer authenticates the user account name and password. If they are valid and associated with one another, the second computer grants access to the first computer. The terminal interface of the second computer then becomes remotely available to the first computer, such that the user appears to be directly connected to the second computer.

If the first computer and second computer are communicating using a protocol such as RADIUS or TACACS+, without using telnet, the need may arise for either the first computer or the second computer to determine whether the other is still active and available over the logical connection. For example, the first computer may send a command to the second computer and not receive an acknowledgment from the second computer within a reasonable time. The first computer may wish to re-send the command or terminate the session to save system resources. Generally, a reasonable time period to re-send or terminate would be twice the delay acknowledgement ("delay ack") timer in TCP/IP. If the delay ack timer is ten seconds, then the client would wait approximately 20 or 30 seconds before re-sending or terminating. This 20–30 second time period ensures that commands will not be re-sent or that the receiver will not be terminated unnecessarily in the event that the receiver is only slowing down or interrupted temporarily.

As another example, a system may be arranged to permit a predefined maximum number of connections between a client and server, or between a first server and a second server. A user, "fred", may be entitled to establish a maximum of one connection from an access server associated with fred to a remote server. If the access server loses power or crashes, fred will not be able to dial in or establish a second connection because that connection would violate the allowed maximum. Thus, there is a need for a method that can enable the client to determine whether the access server is active.

Unfortunately, certain encrypted server-to-server communication languages or protocols, such as TACACS+ and RADIUS, provide no efficient way for a first server to know when a second server at the other logical end of the connection has gone offline. In this context, "offline" is used broadly to mean unavailable as a result of power failure, catastrophic system crash, transition to a degraded state, or disconnection of a logical or physical connection to a network. In a past approach, a user would execute telnet using a terminal interface, so that the user could type commands to the telnet program and view responses by the remote system. In this past approach, there are visual cues to indicate when either the client or access server had gone off-line. If a user of the client, a PC user for example, depressed a key at the client machine and received no response, the user could surmise that the host had gone offline, and could thereafter terminate the session. Alternatively, the user could test whether the PC had stopped operating or crashed. In this context, a device is "off-line" when it is disconnected, crashed, or otherwise logically or physically unavailable.

When the first server communicates to the second server using an embedded protocol, however, there are no visual cues. The protocol is executed by the servers within a network, but such servers do not provide a visual display to the end user when they are in operation. Currently, the only way to know whether the client or access server has gone off-line or become unavailable is to use a timeout mechanism. In some telnet systems, timeout code will disconnect the access server and client after a pre-defined period of inactivity. This approach is a waste of system resources, however, because the access servers and/or outbound modems are occupied and unavailable during this period. Maintaining a TCP/IP connection for an Internet activity using the telnet protocol, for example, ties up buffer space and control sources in operating systems on both ends. Most systems have limited resources, and it is undesirable to leave open connections where there is no communication. Leaving an open telnet connection can also be a security breach.

Accordingly, it is desirable to have a method or system that enables a first server to know immediately when a second server has gone off-line. With such a method or system, the connection could be terminated or a recovery option could be implemented immediately.

One solution is to create a new protocol to handle this situation. However, this approach is undesirable because of the burden associated with creating and obtaining approval for a new standard. It is desirable to have a method or system that does not require development of a new system protocol and that could use available standard protocol options.

Further, it is desirable to have a method that would allow a first computer or second computer to let the other know it is "alive" on a frequent basis without requiring an inordinate amount of system resources.

One past approach to a similar problem involves using the UNIX command "finger". When the "finger" command is sent from a first node to a second node, in effect, the first node is asking the second node, "who are you?", and the second node responds by giving its identity. Use of "finger" is impractical in the modern network environment, however, because many network nodes (such as network access servers) can be configured not to respond to "finger" inquiries. In fact, "finger" is commonly "turned off" by network administrators because it is not password-protected, and provides a potential way for unauthorized devices or users to penetrate network security.

Another approach to a similar problem is described in co-pending U.S. patent application Ser. No. 09/154,608, filed Sep. 16, 1998, entitled "DETECTING AN ACTIVE NETWORK NODE USING AN INVALID PROTOCOL OPTION," and naming Glenwood Clark as inventor. The Clark application describes an approach to determining whether a remote server is "alive" by sending an invalid command, in an agreed-upon protocol, to the remote server. The remote server is deemed to be alive if it responds by refusing to carry out the invalid command.

However, this approach may be insufficient for the needs of certain network nodes or applications. For example, some network nodes and applications need to know not only that a second network node is powered-up and operating, but that particular authentication elements of the second network node are active and operating. An example of an application that needs such a capability is CiscoSecure, commercially available from Cisco Systems, Inc. CiscoSecure is a set of application programs that require, in part, that authentication, authorization and accounting ("AAA") software elements are active, operating and available at the second network node. Without the AAA elements, CiscoSecure and similar applications cannot properly interoperate with the second network node.

The Clark approach, however, does not inform the client or other network node that authentication elements of the remote server are functioning properly. In particular, the Clark approach does not provide a way to verify that AAA elements of the remote server are operational; the Clark approach only confirms that the telnet software of the remote server is running. Thus, there is a need for a mechanism to enable a first network node to contact a second network node to determine whether authentication elements of the second network node are up and running.

Another approach is to use the UNIX "ping" command. A first node sends a "ping" command to the second node, which responds with a message indicating that it is working. This approach, though, operates at a low logical level and is inadequate to assure that certain higher-level software elements of the second node are working. For example, "ping" might provoke a correct response from a second node, even though the AAA elements of the second node have crashed. Thus, there is a need for a way to determine whether elements of a node that operate at a higher logical level are operational.

SUMMARY OF THE INVENTION

The foregoing needs, and other needs and objectives that will become apparent from the description herein, are achieved by the present invention, which comprises, in one aspect, method of determining from a first node in a network whether a second node is active, wherein the first node has previously established a logical connection to the second node, comprising communicating network messages between the first node and the second node; after a pre-determined period of inactivity in communicating the network messages: generating login information that is invalid at the second node; sending an invalid login command to the second node that contains the invalid login information; and determining that the second node is active when the second node responds to the login command by refusing to execute a login of the first node.

One feature of this aspect involves determining that the second node is inactive when the second node fails to respond to the invalid login command after a predetermined time period. According to another feature, generating login information comprises generating a randomly-selected invalid user identifier and generating a randomly-selected invalid password that is associated with the user identifier.

Another feature is that sending a login command comprises sending a Telnet protocol login command, containing the invalid user information as a parameter, from the first node to the second node. Another feature is that sending a login command comprises sending a Telnet login command, with the invalid user identifier and user password as parameters, to the second node.

Other aspects and features will become apparent from the following description and appended claims. In particular, the invention encompasses an apparatus and a computer-readable medium in the form of a carrier wave that are configured, in certain embodiments, to carry out the foregoing steps.

BRIEF DESCRIPTION OF THE DRAWINGS

The present invention is illustrated by way of example, and not by way of limitation, in the figures of the accom

DETAILED DESCRIPTION OF THE PREFERRED EMBODIMENT

A method of notifying a first network node that a second network node has gone off-line is described. In the following description, for purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Overview of Operational Context Communication System

Figure 1:
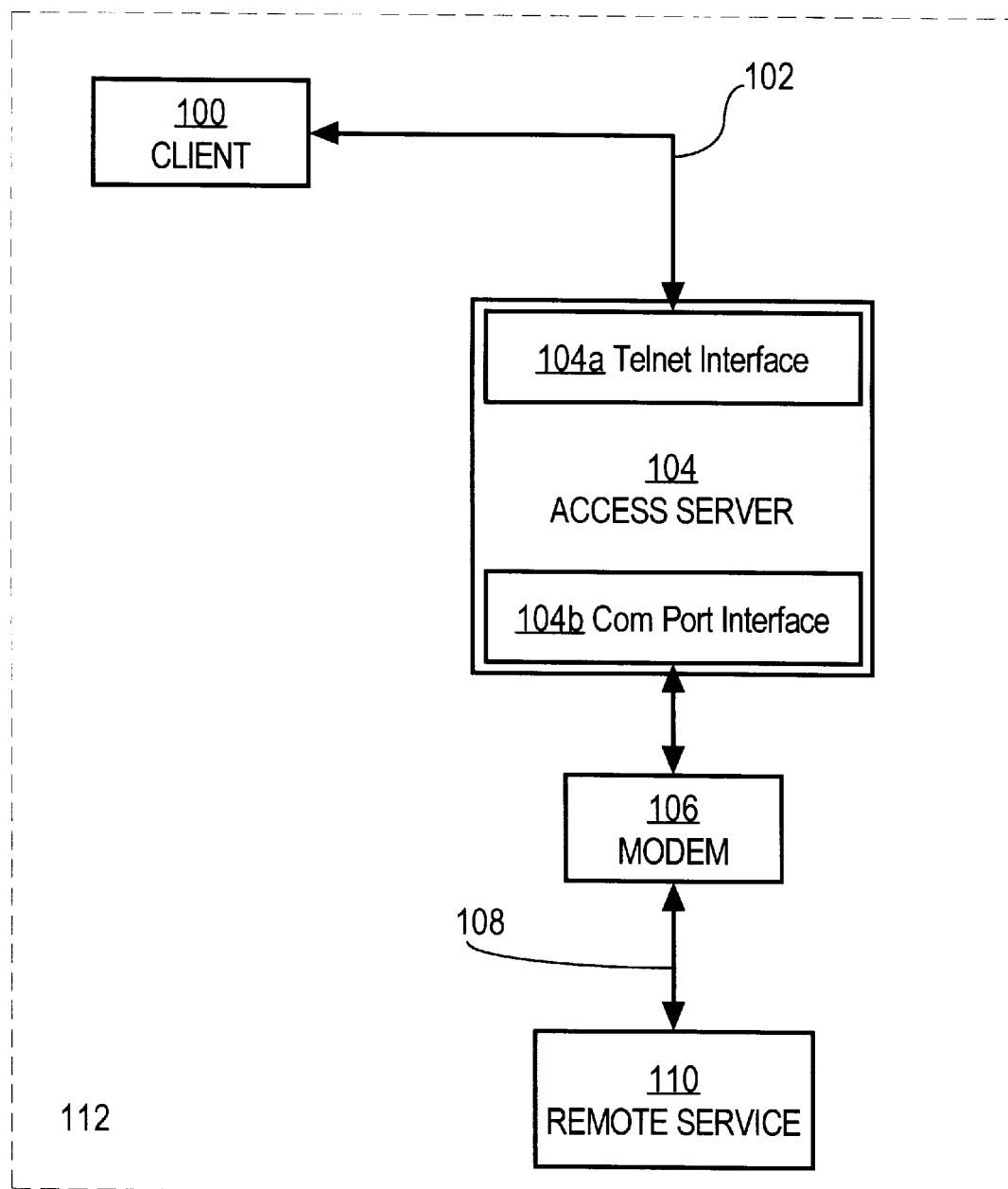
- FIG. 1 is a block diagram of a communication system.

FIG. 1 is a block diagram of a communication system 112 illustrating a client 100 that is coupled to a remote service 110 through access server 104. In the preferred embodiment, the client 100 resides on a local area or enterprise network 102 supported by an access server 104. The client 100 may be any network device that can carry out a telnet session with the access server 104. Client 100 may specifically refer to a personal computer or any device having a communication port wherefrom data may be transferred. Client 100 may also refer to any software program on the computer or device that is used to contact and obtain data from a server software program, where the client and server are either located on the same premise or are in different locations separated by a significant distance. Any client 100 programs may be designed to work with one or more specific kinds of server programs, and each server may require a specific kind of client.

The communication port traffic from the client 100 is converted to a telnet session and sent to the access server 104. In the preferred embodiment, the access server 104 is any network device which accepts telnet sessions and passes the data received to a corn port, and passes data received from the communication port to the client 100 via the telnet session. The access server 104 may be a computer, or a software package, which provides a specific kind of service to client software running on other computers. Access server 104 may therefore refer to a particular piece of software, or to the machine on which the software is running. A single server machine could have several different server software packages running on it, thus providing many different servers to clients on the network.

In the preferred embodiment, the access server 104 will have a protocol interface, such as the telnet interface 104a shown in FIG. 1. Access server 104 also has at least one communication port interface 104b ("com port interface"), and an interface to a local area or enterprise network 102. The access server 104 may provide point-to-point protocol connections, meaning that the access server 104 uses a regular telephone line and a modem to make network connections. Alternatively, the access server 104 may use any protocol which allows for connection to an external network such as the global, packet-switched network known as the Internet.

The modem 106 interfaced with the comport interface 104b can be any modem device that connects the server to a public switched network by network connection 108, allowing the client to communicate with a remote service 110 through the phone system. Modem 106 may comprise a single modem device or a plurality ("bank") of modems. The remote service 110 can be any service that accepts dial-up connections, such as an Internet Service Provider, a bulletin board or even a fax machine.

In this configuration, access server 104 may provide selective access of client 100 to the remote service 110 or to network connection 108. For example, the access server 104 may be configured with appropriate software to authenticate client 100 when the client seeks to access the network connection. The access server 104 also may be a router or packet data switch.

Client 100 and access server 104 are examples of network nodes or computer processes with which embodiments of the invention may be used. The network nodes may be any element of a network. A client/server relationship among the nodes is not required. Client 100 and access server 104 may be implemented in hardware, software, or a combination of both hardware and software.

Embedded Protocol

Preferably, access server 104 executes an embedded protocol that defines a communication session between client 100 and access server 104. Within the Internet, telnet is the most commonly used facility for supporting remote login sessions. The telnet protocol defines how local and remote computers talk to one another to support a communications session whereby a local computer remotely contacts and logs into the remote computer ("remote login session"). Telnet currently has approximately forty-five (45) on/off parameters that are set during a negotiation phase. In the negotiation phase, the client and access server determine the parameters which will later guide and facilitate the transfer and communication of data. The parameters include, for example, terminal speed, window size, display location, terminal location number, end of record, echo and other aspects of the communication session. The parameters may be set by issuing a command having the syntax "DO [value]", where "value" is a two-octet (2 bytes) value that can represent any value from 0–255.

Telnet has a standard login mechanism. The process by which a first network node logically connects to a second network server at the application layer is called remote login. The telnet protocol defines a login command that receives login information as a parameter. Generally, the login information is a user identifier ("user id" or "userid") and a password. To establish a remote login to another network node, a first network node sends the telnet login command to the second server with the login information as parameter values.

Telnet is merely one example of a protocol that can be used with embodiments of the invention. No particular protocol is required. What is important is that the protocol defines a request-response mode of operation and defines a mandatory response when an invalid request or command is received. For example, a first network node issues a request to a second network node, and the protocol dictates that the second network node shall respond with a message that acknowledges how the second network node is handling the request. The responsive message may be in the nature of an acknowledgment, a refusal, a success report, an error message, a confirmation, or the like. In one embodiment, the protocol may define a particular mandatory responsive message. In another embodiment, the protocol may define that the responsive message must be returned to the client promptly or immediately. These characteristics, however, are not required.

Determining Whether Client or Server is Off-Line

There is no efficient way for either the client 100 or access server 104 to know whether the other is off-line. Prior to the use of telnet as an embedded protocol, the telnet prompt commands and responses could be viewed on a computer display as a user typed requests and received responses from a remote system. If a command was sent and there was no response, a client user could recognize this immediately and either re-send the command or terminate the session. When telnet is operated as an embedded protocol layered with other software, in an access server, router, or other device that does not have a visual user interface, there is no visual way for the client 100 or access server 104 to know whether the other is off-line, whether to recover or terminate the session, thereby saving system resources.

Further, when the client 100 is allowed a restricted or fixed, pre-determined number of connections between itself and the access server 104, and the access server crashes, there may be no way for the client to re-connect to the access server, because an additional connection cannot be established.

Figure 2:
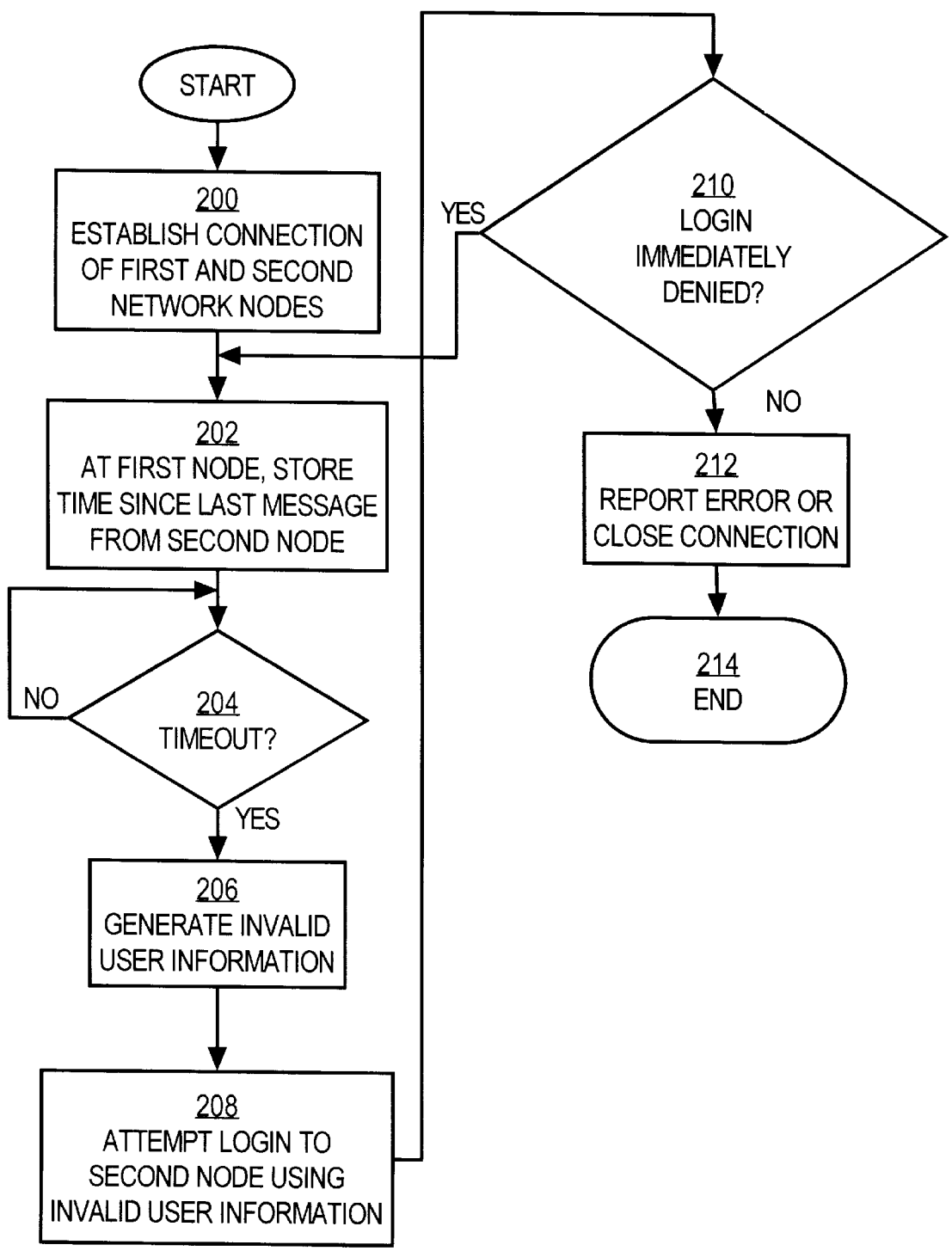
FIG. 2 is a flow chart showing a method of determining from a first node in a network whether a second node is active, according to one preferred embodiment.

Use of Invalid Login Attempt to Notify Client or Server that a Device is Off-Line FIG. 2 is a block diagram showing a method of notifying a first network node that a second network node has gone off-line, according to a preferred embodiment.

In particular, FIG. 2 depicts messages exchanged between the dial out modules of the client 100 and access server 104. The process of FIG. 2 may be implemented as one or more computer programs, functions, subroutines, processes, methods and the like, either in stand-alone form or callable from another program or process.

In block 200, a connection is established between a first node of a network and a second node of a network. Each of the first node and the second node may be a server, client, or any other network device or computer device that supports a protocol that has a login feature. In the preferred embodiment, block 200 involves establishing a client-server connection between a client such as a router and a server such as a network access server.

Block 200 may involve establishing a telnet connection between the first node and second node; however, this is not required. Setting up a telnet connection, or a connection in any other protocol, is preferably delayed until it is needed later in the process.

In block 202, the process stores, at the first network node, a time value representing the time that has elapsed since the last time that the first network node received a message or other communication from the second network node. Block 202 may involve establishing a timer. The timer may be established using an existing feature or embedded function of the protocol that is used for communications between the first and second network nodes.

In block 204, the process tests whether a timeout has occurred. Block 204 may involve testing whether the timer value stored in block 202 has reached or exceeded a pre-determined timeout value. Examples of suitable timeout values are in the range of a few seconds to 15 minutes or more. Any other timeout value may be selected according to the needs of a particular application of the method. For example, in systems that are expected to have relatively high network traffic, the timeout value may be set to a relatively small value, e.g., 1 minute, because messages from the second server are normally expected to be received before then.

In an alternate embodiment, block 204 may also involve "retries," that is, attempting to carry out a harmless function or command which, if successful, will indicate that the second network node is alive. The retry approach is desirable to account for transient delays in receiving communications from the second network node, or temporary failures of the second network node. For example, it is desirable that events such as a temporary power outage at the second network node should not trigger a login attempt as described below.

If the result of the test of block 204 is FALSE, then the test of block 204 is repeated successively. Further, if the first network node receives a message or other communication from the second network node, the timer value stored in block 202 may be re-initialized, for example, by being re-set to zero or some other pre-defined starting value.

If the result of the test of block 204 is TRUE, then control passes to block 206, in which invalid login information is generated. Block 206 may involve generating a randomly selected user id and a randomly selected password. Block 206 may involve generating a string of characters having a pre-determined fixed length or a randomly selected fixed length. The particular method used to generate the invalid login information is not critical, and the particular type of invalid login information that is generated also is not critical. What is important is that block 206 results in generating login information that has an extremely high probability of being invalid when subsequently received by a login process of the protocol that is in use by the network nodes.

In block 208, the process attempts to log in to the second network node using the invalid login information. For example, the first network node sends a telnet login command to the second network node, and provides the invalid login information that was generated in block 206 as values of parameters to the login command.

Block 208 may also involve setting up and establishing a connection to the second network node in a pre-defined protocol. The preferred protocol is telnet. Thus, if the first network node has not previously "telnetted" to the second network node, then the first network node telnets to the second network node in block 208, before attempting to log in to the second network node. Use of telnet is not required, and any conveniently available protocol or other communication transport mechanism may be used. Telnet simply represents one protocol that is generally supported by network access servers and other network nodes, and is therefore conveniently available.

In block 210, the process tests whether the second network responds with a message indicating that the login information is invalid. Block 210 may involve the second network node sending a message to the first network node that indicates that the login attempt is refused, or that the password is invalid, or that the user id is invalid. The particular form and content of the message is not critical. What is important is that the second network node refuses to accept a login based on the invalid login information generated in block 206.

If the test of block 210 is TRUE, then the second network node has responded. This informs the first network node that the second network node is active and operating. Accordingly, control is passed to block 202 in which the timer value is re-initialized and stored at the first network node.

If the test of block 210 is FALSE, then the second network node has not responded. This informs the first network node that the second network node is unavailable, inactive or not operating. Block 210 may involve the steps of testing whether a response is immediately received in response to the invalid login attempt. In this context, "immediately" means waiting for a time period far shorter than the typical client-server timeout time period. For example, "immediately" may mean a time in the range of 10 to 30 seconds, with a typical waiting period being 10 seconds. Thus, the steps of block 210 can provide a way for the first network node to know relatively immediately whether the second network node is alive and operating, without using an embedded protocol timer, a timeout or other long delay. This feature can be accomplished when the protocol used for connection between the first network node and the second network node is defined to require an immediate response to a login attempt.

In the preferred embodiment, block 210 also involves re-trying an invalid login to the second network node. Preferably, block 210 involves three (3) such re-tries. Carrying out three re-tries before concluding that the second network node is down helps guard against taking overly aggressive responsive action when the second network node is merely temporarily unavailable, for example, during a transient power outage.

Further, if the test of block 210 is FALSE, then an error condition may be signaled, as indicated by block 212. The steps of block 212 may involve causing the client to display an error message at the client station. Alternatively, block 212 may involve closing the connection between the first network node and the second network node.

Using the method described above and shown, in one embodiment, in FIG. 2, a first network node may determine whether a second node is active and operational, when the second node has not communicated with the first node in a predetermined period of time, and even when the first node is restricted to establishing only a single connection to the second node. For example, when a client is allowed only one connection to an access server, and the access server suddenly stops responding for a period of time, the client can attempt to login to the access server using invalid telnet information. When the server responds by refusing the login attempt, the client knows that the server is still active. If the server does not immediately respond, within a period of time shorter than the typical timeout, the client immediately knows that the server is offline or inactive. The client may then take corrective action, for example, by closing the current connection and attempting another connection.

In addition, this approach enables the first network node to determine that AAA software elements of the second network node are active and operational. If the AAA software elements of the second network node have crashed or are inactive, the second network node will not be able to process the invalid login request, and in many cases will not respond to the invalid login request. Thus, the method described herein not only enables the first network node to confirm that the second network node is alive at a low level, it also enables the first network node to confirm that higher-level software elements of the second network node, such as the AAA elements, are active and operational.

Another advantage is that the present method preferably uses the telnet protocol, which is password-protected and rarely turned off by network administrators. This overcomes the disadvantages of the "finger" and "ping" approaches described above.

While the preferred embodiment addresses the problem of determining whether an access server is active in the context of client-server arrangement having a predetermined maximum number of allowed connections, alternate embodiments are used for any serial device attached to an access server. Such devices could be serial printers, plotters, monitoring devices such as pipeline monitors or medical monitors and general office equipment such as photocopiers and cash registers.

Hardware Overview

Figure 3:
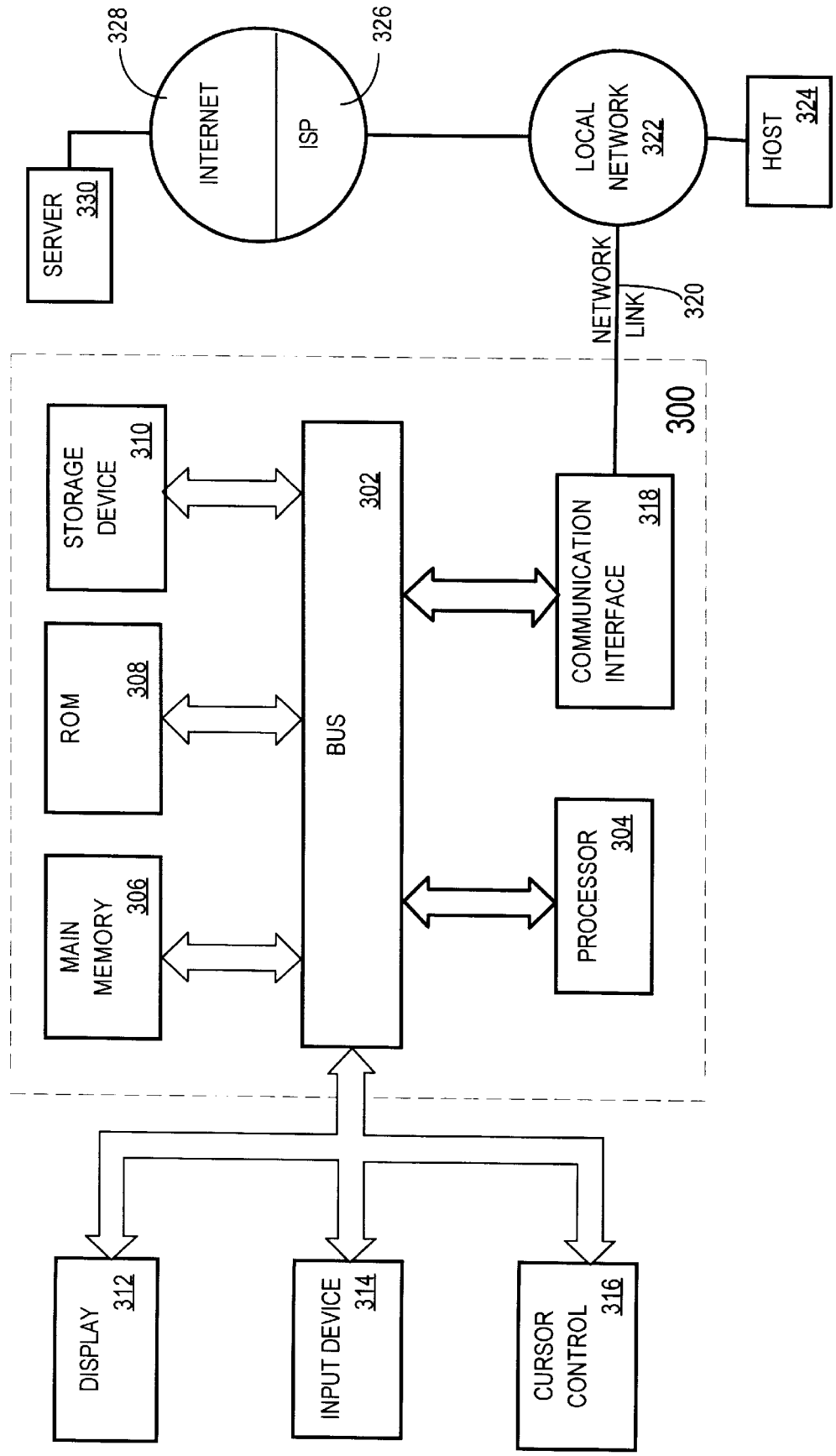
FIG. 3 is a block diagram of a computer system that may be used in the implementation of the invention.

FIG. 3 is a block diagram that illustrates a computer system 300 upon which an embodiment of the invention may be implemented. Computer system 300 includes a bus 302 or other communication mechanism for communicating information, and a processor 303 coupled with bus 302 for processing information. Computer system 300 also includes a main memory 306, such as a random access memory (RAM) or other dynamic storage device, coupled to bus 302 for storing information and instructions to be executed by processor 303. Main memory 306 also may be used for storing temporary variables or other intermediate information during execution of instructions to be executed by processor 303. Computer system 300 further includes a read only memory (ROM) 308 or other static storage device coupled to bus 302 for storing static information and instructions for processor 303. A storage device 310, such as a magnetic disk or optical disk, is provided and coupled to bus 302 for storing information and instructions.

Normally computer system 300 is configured without a display, keyboard, mouse or like devices because such input/output devices are not necessary for embedded operation in a network. Computer system 300 may be coupled via bus 302 to a communications interface 312 that can be coupled to an external terminal or host system, for displaying information to a computer user or for receiving configuration input. For example, communications interface 312 may be an RS-232 port that is coupled to a terminal or workstation. Computer system 300 executes an internetworking operating system, such as the IOS operating system available from Cisco Systems, Inc. The operating system provides a command-line interface to the terminal or workstation over communications interface 312.

The invention is related to the use of computer system 300 for notifying a first network node that a second network node is offline. According to one embodiment of the invention, such a method is provided by computer system 300 in response to processor 303 executing one or more sequences of one or more instructions contained in main memory 306. Such instructions may be read into main memory 306 from another computer-readable medium, such as storage device 310. Execution of the sequences of instructions contained in main memory 306 causes processor 303 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 303 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 303 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector can receive the data carried in the infrared signal and appropriate circuitry can place the data on bus 302. Bus 302 carries the data to main memory 306, from which processor 303 retrieves and executes the instructions. The instructions received by main memory 306 may optionally be stored on storage device 310 either before or after execution by processor 303.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 323 or to data equipment operated by an Internet Service Provider (ISP) 326. ISP 326 in turn provides data communication services through the worldwide packet data network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for notifying a first network node that a second network node is offline as described herein.

The received code may be executed by processor 303 as it is received, and/or stored in storage device 310, or other non-volatile storage for later execution. In this manner, computer system 300 may obtain application code in the form of a carrier wave.

Variations, Extensions

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense

What is claimed is:

1. A method of determining from a first node in a network whether a second node is active, wherein the first node has previously established a logical connection to the second node, comprising the computer-implemented steps of:
   communicating network messages between the first node and the second node;
   after a pre-determined period of inactivity in communicating the network messages:
   generating login information that is invalid at the second node;
   sending an invalid login command that contains the invalid login information to the second node; and
   determining that the second node is active when the second node responds to the login command by refusing to execute a login of the first node.

2. The method recited in claim 1, further including:
   determining that the second node is inactive when the second node fails to respond to the invalid login command after a predetermined time period.

3. The method recited in claim 1, wherein generating login information comprises generating a randomly-selected invalid user identifier and generating a randomly-selected invalid password that is associated with the user identifier.

4. The method recited in claim 3, wherein sending a login command comprises sending a Telnet login command, with the invalid user identifier and user password as parameters, to the second node.

5. The method recited in claim 1, wherein sending a login command comprises sending a Telnet protocol login command, containing the invalid user information as a parameter, from the first node to the second node.

6. In a network system comprising a first node and a second node that communicate over a network using Telnet protocol, a method of determining from the first node whether the second node is operational, the method comprising:
   after a predetermined period of inactivity in communicating network messages:
   generating login information that is invalid at the second node;
   sending an invalid login command that contains the invalid login information to the second node;
   determining that the second node is active only if the second node immediately responds to the login command by refusing to execute a login of the first node; and
   determining that the second node is inactive only if the second node fails to immediately respond to the invalid login command.

7. A method of determining whether an access server is active, from a client that is coupled through a network to the access server, and wherein a fixed pre-determined number of connections are permitted between the client and the access server, comprising:
   communicating network messages between the client and access server;

after a pre-determined period of inactivity in communicating the network messages:

generating invalid login information at the client;

sending an invalid login command that contains the invalid login information from the client to the access server; and determining that the access server is active only if access server immediately responds to the login command by refusing to execute a login of the client.

8. The method recited in claim 7, further including:

determining that the access server is inactive only when the access server fails to respond to the client after a predetermined time period.

9. The method recited in claim 7, wherein generating invalid login information comprises generating, at the client, a randomly-selected user identifier and generating a randomly-selected user password, wherein the user identifier and user password are invalid at the access server.

10. The method recited in claim 7, wherein sending a login command comprises sending a Telnet login command, containing the invalid user information as a parameter, from the client to the access server.

11. A network node, comprising:

a network interface coupled through a network to a second node whereby the network node is logically connected to the second node;

one or more processors; and a memory comprising one or more sequences of instructions which, when executed by the one or more processors, cause the network node to carry out the steps of:

communicating network messages between the first node and the second node;

after a pre-determined period of inactivity in communicating the network messages:

generating login information that is invalid at the second node;

sending a login command, including the login information, from the first node to the second node; and determining that the second node is active only if the second node immediately responds to the login command by refusing to execute a login of the first node.

12. The network node recited in claim 11, the memory further including sequences of instructions that cause the network node to carry out the steps of:

determining that the second node is inactive only when the second node fails to respond to the first node after a predetermined time period.

13. The network node recited in claim 11, wherein generating login information comprises generating a randomly-selected user identifier and generating a randomly-selected user password.

14. The network node recited in claim 13, wherein sending a login command comprise sending a Telnet login command, with the user identifier and user password as parameters, to the second node.

15. The network node recited in claim 11, wherein sending a login command comprises sending a Telnet protocol login command, containing the user information as a parameter, from the first node to the second node.

16. A computer-readable medium comprising one or more sequences of instructions, which when executed by one or more processors, cause the one or more processors to carry out the steps of:

communicating network messages between a first node and a second node;

after a pre-determined period of inactivity in communicating the network messages:

generating login information that is invalid at the second node;

sending an invalid login command, including the invalid login information, from the first node to the second node; and determining that the second node is active only if the second node immediately responds to the login command by refusing to execute a login of the first node.

17. The computer-readable medium recited in claim 16, wherein generating login information comprises generating a randomly-selected user identifier and generating a randomly-selected user password.

18. The computer-readable medium recited in claim 16, and wherein sending a login command comprises sending a Telnet login command, including the user identifier and the user password as parameters, to the second server.

19. An apparatus for determining from a first node in a network whether a second node is active, wherein the first node has previously established a logical connection to the second node, comprising:

means for communicating network messages between the first node and the second node;

means for generating, after a pre-determined period of inactivity in communicating the network messages, login information that is invalid at the second node, for sending an invalid login command that contains the invalid login information to the second node, and for determining that the second node is active when the second node responds to the login command by refusing to execute a login of the first node.

20. The apparatus recited in claim 19, further including means for determining that the second node is inactive when the second node fails to respond to the invalid login command after a predetermined time period.

21. The apparatus recited in claim 19, wherein the means for generating login information comprises means for generating a randomly-selected invalid user identifier and generating a randomly-selected invalid password that is associated with the user identifier.

22. The apparatus recited in claim 21, wherein the means for sending a login command comprises means for sending a Telnet login command, with the invalid user identifier and user password as parameters, to the second node.

23. The apparatus recited in claim 19, wherein the means for sending a login command comprises means for sending a Telnet protocol login command, containing the invalid user information as a parameter, from the first node to the second node.

24. A method of determining from a first node in a network whether a second node is active, wherein the first node has previously established a logical connection to the second node, comprising the computer-implemented steps of:

communicating network messages between the first node and the second node;

after a pre-determined period of inactivity in communicating the network messages:

at the second node, generating login information that is known to be invalid;

sending an invalid login command that contains the invalid login information to the second node; and automatically determining that the second node is active when the second node responds to the login command by refusing to execute a login of the first node.

* * * * *